March 16, 1943. F. C. RUSHING 2,313,893
LOW FREQUENCY RESILIENT MOUNTING
Filed Sept. 19, 1941 2 Sheets-Sheet 1

WITNESSES:

INVENTOR
Frank C. Rushing.
BY
Paul E. Friedemann
ATTORNEY

March 16, 1943.  F. C. RUSHING  2,313,893
LOW FREQUENCY RESILIENT MOUNTING
Filed Sept. 19, 1941  2 Sheets-Sheet 2
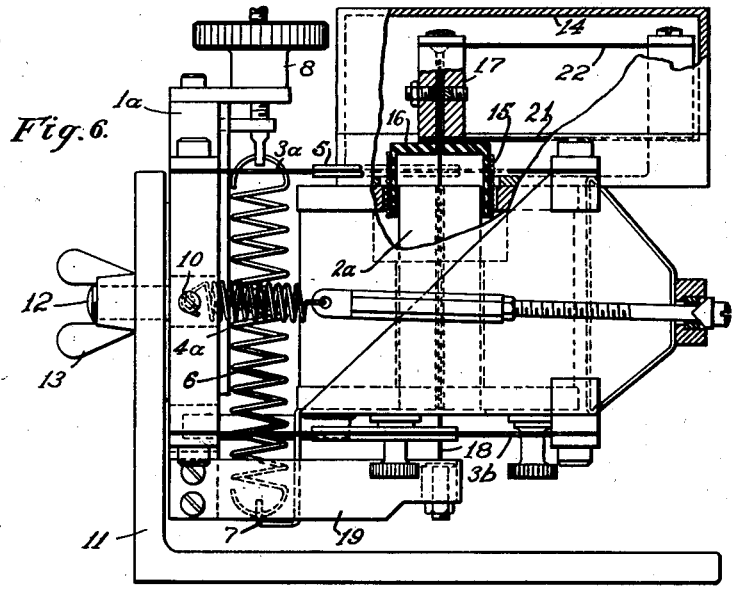
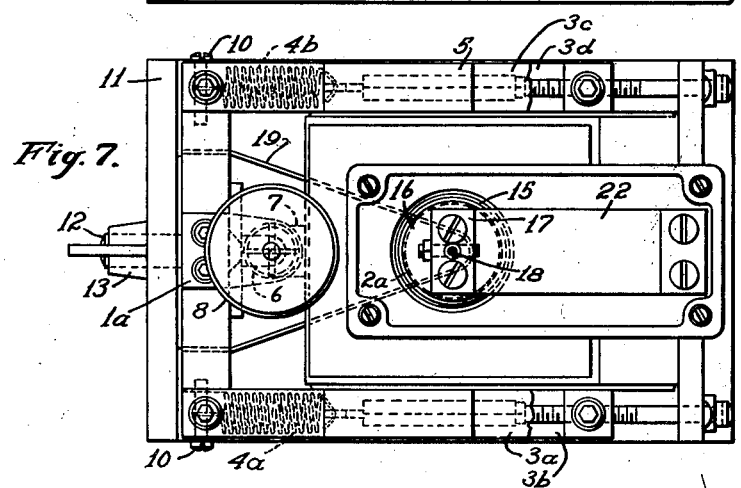
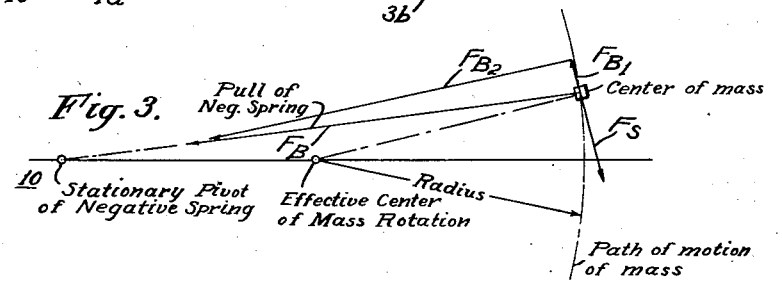
WITNESSES:  
INVENTOR
Frank C. Rushing.
BY
ATTORNEY Patented Mar. 16, 1943

2,313,893

UNITED STATES PATENT OFFICE 2,313,893

LOW FREQUENCY RESILIENT MOUNTING

Frank C. Rushing, Pittsburgh, Pa., assignor to Westinghouse Electric & Manufacturing Company, East Pittsburgh, Pa., a corporation of Pennsylvania Application September 19, 1941, Serial No. 411,598

14 Claims. (Cl. 171—209)

My invention relates to a low frequency resilient mounting structure which is useful in vibration measuring devices, such as used for measuring vibrations of a motor frame or of a flexibly supported rotating rotor as found in balancing machines. My invention is also applicable to vibration isolating devices, that is wherein an object is resiliently mounted so that it remains practically stationary although the support vibrates.

An object of my invention is to provide a resilient mounting for a vibration measuring device which is so constructed as to measure comparatively low frequencies of vibration.

An object of my invention is to provide a low frequency vibration measuring mounting which is rugged in construction and which has a comparatively long life.

Another object of my invention is to provide a resilient mounting for a vibration measuring device which mounting is so constructed as to reduce the effectiveness of the spring constant $k$ in the mounting system so as to reduce the frequency as measured by the formula $$f \text{ (frequency)} = \frac{1}{2\pi}\sqrt{\frac{k}{m}}$$

where $m$ is the mass of the body.

Other objects and advantages will become more apparent from a study of the following specification when considered in conjunction with the accompanying drawings, in which:

Fig. 3 is a force diagram showing the mechanics of the device shown in Figs. 1 and 2; and Figs. 4 and 5 schematically show modes of bending of members $3a$, $3b$, $3c$, or $3d$.

Fig. 6 is a side view (partly in section) of electromagnetic pick up device embodying the features involved in Figs. 1 and 2, but which is adjustable to vibrate in other than the vertical direction.

Fig. 7 is a top view (with the magnet cover removed) of the device shown in Fig. 6.

The translational natural frequency of a resiliently mounted mass can usually be approximately expressed by the formula:

$$f = \frac{1}{2\pi}\sqrt{\frac{k}{m}} \text{ cycles per second}$$

In this formula $m$ is the mass of the body in question, and $k$ is the spring constant in terms of force per unit distance required to deflect the center of gravity of the body in the direction of the vibration. An analogous consideration pertains to angular vibration.

With a given mass, $m$, to obtain a low natural frequency requires a low value for $k$. With a given space limitation the resilient member might become too frail to be practical when the frequency required is too low. But in practice it is often necessary to have a small size low frequency mounting for a given mass where ruggedness is a desired characteristic.

An example of this requirement is the seismic mounting of a vibration pickup (Figs. 6 and 7) for measuring vibrations of a body, such as the frame of a motor where the natural frequency in the direction of measurement must be less than the frequency of vibration being measured. In such instance the mass $m$ may be replaced by a permanent magnet which is movable relative to a coil which is rigidly secured to the foundation member.

Figure 1:
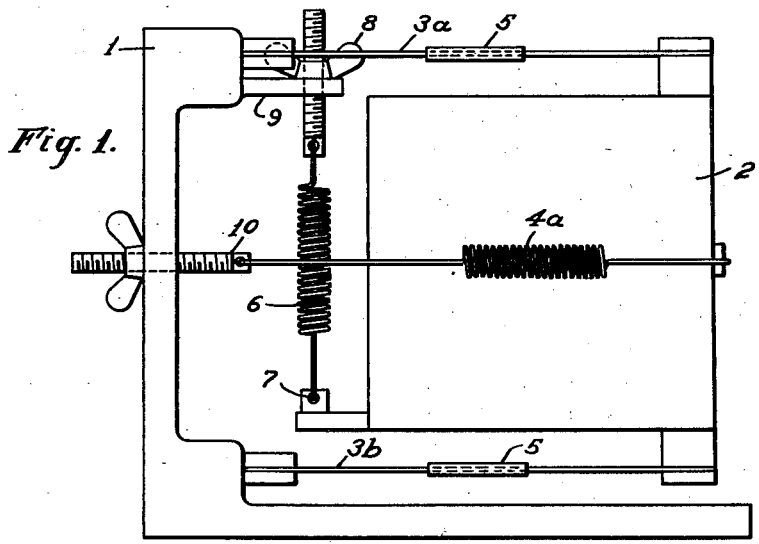
Figure 1 is a side view schematically showing a system for supporting a mass so that it will vibrate in the vertical direction.
Figure 2:
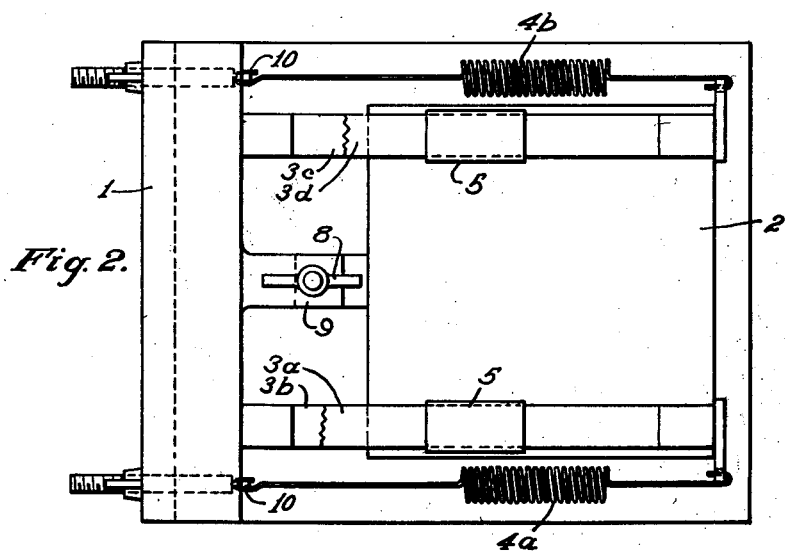
Fig. 2 is a top view of the same device shown in Fig. 1.

Referring more particularly to Figs. 1 and 2, numeral 1 denotes a foundation which is held in a substantially rigid manner. In practice, it can be a rigid frame which can be held against or placed upon the vibrating body. Numeral 2 denotes a mass $m$ which is to have a low natural frequency in the direction in question. In this example the direction is vertical. Numerals $3a$, $3b$, $3c$ and $3d$ denote four mass supporting members which determine the motion of the mass allowing it to move up and down (and in and out in addition in some cases) but offering rigid restraint against motion of the mass to the left and right directions in the figure. In this example, they are shown as flat springs built-in at the foundation and at the mass, and they offer rigid restraint for all directions except up and down. Two tension springs $4a$ and $4b$ are provided which tend to pull the mass against the foundation to the left. They load the supporting members $3a$, $3b$, $3c$ and $3d$ in compression. Sleeve like stiffening elements 5 are intended to raise the buckling load of members (3) for the mode of bending shown in Fig. 4 without appreciably affecting the stiffness of the members for the mode of bending shown in Fig. 5. A spring 6 having a low spring constant takes part of the force imposed by gravity upon the mass. It is attached to the mass at 7 and to a screw 8 which is attached to the foundation at 9. This spring force can be adjusted to move the mass to the desired position with respect to the frame or foundation.

If the four supports 3a, 3b, 3c and 3d were rigid links pivoted or hinged at their extremities, the mass could move in an arc whose radius would be equal to the length of the links. But if the supports are built in and have to bend to allow motion, the effective radius of the arc along which the body moves is less than the length of the supports. In general, it can be said that for small motions the mass will move along an arc as shown in Fig. 3. When it moves away from a neutral position a spring force $F_s$ will tend to return it to its neutral position. This force is proportional to displacement and is produced by supports 3a, 3b, 3c and 3d, and level adjusting spring 6 and any other springs present and functioning in the same manner; for example, in a vibration pickup there may be coil supporting springs in addition to those described above.

The tension force $F_B$ in springs 4a and 4b is directed between its two points of attachment. One is on the body and the other is at a point 10 such that the free length of this effective link is greater than the radius of the arc of motion. These relationships are portrayed in Fig. 3. Force $F_B$ will have a component $F_{B1}$ opposite in direction to $F_s$ and it will also have a component $F_{B2}$ perpendicular to $F_s$. The component subtracting from $F_s$ gives a resultant restoring force $(F_s - F_{B1})$ on the mass. This resultant force is proportional to deflection and when divided by deflection will represent the spring constant which can be diminished by increasing $F_{B1}$, which follows when $F_B$ is increased.

Reducing the spring constant in this manner reduces the frequency of the system and serves as a practical means of obtaining a low frequency system while keeping the supporting springs 3a, 3b, 3c and 3d reasonably rugged.

While element 2 has been described as being a mass, such element may be any body or device which it is desired to mount in such a way as to be relatively free of vibration despite the fact that the support member 1 vibrates on some vibratable supporting structure. As such, the system is, in effect, a vibration isolating system.

Figs. 6 and 7 show an actual instead of schematic view of the structure shown in Figs. 1 and 2 with certain additions and modifications. Reference numerals which refer to the same parts are identical in Figs. 1-2 and Figs. 6-7. The foundation number 1a is equivalent to the foundation 1 in Fig. 1. It is, however, adjustably mounted on a supporting frame 11 and the entire assembly is pivotally mounted on a shaft 12 and may be adjustably secured in any particular position by wing nut 13. This type of design will serve for any direction of vibration. As the entire unit which is mounted on foundation member 1a is adjustably rotated about shaft 12 to different angular positions, it may be used to serve for any direction of vibration. It will be necessary, however, to change the stretch in the levelling spring 6 to compensate for the pull of gravity, as its effect on the system is changed due to the space orientation. In Figs. 6 and 7, the permanent magnet 2a replaces the mass 2 shown in Fig. 1. Rigidly secured to and forming a part of the permanent magnet 2a is a cover portion 14 which encloses an electrical pickup coil 15. Pickup coil 15 is mounted on a cylindrical support 16 which is secured by a suitable fastening means 17 to a stiff wire 18 extending through the permanent magnet 2a and the lower end of which wire is rigidly secured to a substantially V-shaped supporting arm 19, which supporting arm is rigidly secured to member 1a. In other words, the coil 15 is rigidly secured to member 1a, while the permanent magnet 2a is relatively movable thereto by virtue of its suspension by leaf springs 3a, 3b, 3c and 3d. Leaf springs 21 and 22 provide a flexible connection between the coil supporting structure and the cover member 14 of the magnet so as to allow relative movement between the coil and magnet. By the above construction of the electromagnet whenever, through accident or otherwise, there is any change laterally in the relative position of the permanent magnet 2a with respect to the supporting frame 1a, then the most that can happen is that the stiff wire 18 will bend slightly and compensate for this erroneous positioning and the coil 15 together with its relative position with respect to magnet 2a will remain in substantially its initial position to form substantially the same air gap and is in no way changed, or disturbed. Fig. 7 shows the top cover removed from cover 14 in order to show the internal structure thereof.

If the assembly is oriented so that the supporting members 3a, 3b, 3c and 3d are vertical and compressed by the mass, the pull of gravity will act in a manner to add to the effect of the negatively acting springs 4a and 4b. In Fig. 3, it would be effectively a force similar to $F_B$ but with its pivot at infinity. This gravity effect to reduce natural frequencies is well known.

I am, of course, aware that others particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A vibration detecting device comprising, in combination, a base, a mass, a plurality of link means for yieldably supporting said mass and for allowing movement thereof in substantially only one plane, spring means for effectively reducing the spring constant of said link means, and means for generating a voltage which corresponds to the relative movement between said base and mass.

2. A vibration detecting device comprising, in combination, a base, a mass, a plurality of flat springs for yieldably supporting said mass on said base and for allowing movement of said mass in substantially only one plane, spring means for biasing said mass towards said base and for effectively reducing the spring constant of said yieldably supported mass, and means responsive to relative movement between said base and mass for measuring the frequency and amplitude of vibration of said mass when said base is placed against a vibrating body.

3. Apparatus as set forth in claim 1 in which said link means comprise a plurality of flat springs.

4. Apparatus as set forth in claim 1 in which said link means comprise a plurality of flat springs each of which is provided with an intermediate stiffening element in order to provide a predetermined mode of deflection.

5. Apparatus as set forth in claim 2 in which each of said flat springs is provided with a stiffening element in order to impart to the springs a predetermined mode of deflection.

6. Apparatus as set forth in claim 2 in which said spring means are interconnected between and stubstantially parallel with said flat springs and having their terminals connected to said mass and base respectively, thereby giving a toggle, negative spring effect.

7. A vibration measuring device comprising, in combination, a base, a mass, a plurality of springs for yieldingly and freely supporting said mass on said base, allowing pivotal movement thereof, toggle spring means for imparting a toggle effect on said mass to urge it away from its normal, supported position for reducing the spring constant of said supporting springs, and means for generating a voltage which corresponds to the relative movement between said base and mass.

8. Apparatus as recited in claim 7 together with a supporting means for supporting said base and pivot means for angularly adjusting said base with respect to said supporting means so as to permit vibrations of said mass in any of a plurality of selective directions at right angles to said pivot means.

9. Apparatus as recited in claim 7 in which said plurality of springs are flat springs having one end connected to said base and the other end connected to said mass so as to confine vibrations of said mass to substantially a single plane.

10. Apparatus as recited in claim 7 together with a supporting means for supporting said base and pivot means for angularly adjusting said base with respect to said supporting means so as to permit vibrations of said mass in any of a plurality of selective directions at right angles to said pivot means and adjustable spring means for adjusting the normal position of said mass and overcoming the force of gravity.

11. An electromagnetic pick up unit for detecting vibrations comprising in combination a base, a magnet core, a plurality of springs for freely supporting said core on said base so that it moves in substantially one plane, toggle spring means for imparting a toggle effect on said core, normally urging said core to rotate in a direction away from its normal position to exercise a negative spring effect and reduce the spring constant of said supporting springs, and an electrical coil rigidly secured to said base and into which is induced an electric current proportional to the relative movement between said coil and core.

12. Apparatus as recited in claim 11 in which said plurality of springs are flat springs having one end connected to said base and the other end connected to said core so as to confine vibrations of said core to substantially a single plane.

13. Apparatus as recited in claim 11 together with a supporting means for supporting said base and pivot means for angularly adjusting said base with respect to said supporting means so as to permit vibrations of said mass in any of a plurality of selective directions at right angles to said pivot means.

14. Apparatus as recited in claim 11 together with a supporting means for supporting said base and pivot means for angularly adjusting said base with respect to said supporting means so as to permit vibrations of said mass in any of a plurality of selective directions at right angles to said pivot means, and adjustable spring means for adjusting the normal position of said core and overcoming the force of gravity.

FRANK C. RUSHING.